US008989786B2

(12) United States Patent
Feghali

(10) Patent No.: US 8,989,786 B2
(45) Date of Patent: Mar. 24, 2015

(54) SYSTEM AND METHOD FOR GRAPHICAL EXPRESSION DURING TEXT MESSAGING COMMUNICATIONS

(75) Inventor: John Charbel Feghali, Pittsburgh, PA (US)

(73) Assignee: Walking Thumbs, LLC, Pittsburgh, PA (US)

(*) Notice: Subject to any disclaimer, the term of this patent is extended or adjusted under 35 U.S.C. 154(b) by 721 days.

(21) Appl. No.: 13/300,365

(22) Filed: Nov. 18, 2011

(65) Prior Publication Data
US 2012/0270578 A1 Oct. 25, 2012

Related U.S. Application Data

(60) Provisional application No. 61/477,605, filed on Apr. 21, 2011.

(51) Int. Cl.
*H04W 4/00* (2009.01)
*H04W 4/14* (2009.01)
*H04L 12/58* (2006.01)

(52) U.S. Cl.
CPC .............. *H04W 4/14* (2013.01); *H04L 51/10* (2013.01); *H04L 51/38* (2013.01)
USPC ........... 455/466; 455/419; 455/566; 345/473; 715/706; 715/762

(58) Field of Classification Search
CPC ............ A63F 2300/5553; A63F 2300/535; A63F 2300/695; A63F 2300/8082; A61B 5/01; A61B 5/744; A61B 5/067; A61B 5/11; A61B 5/1118; A61B 5/1123; A61B 5/6898; A61B 5/743; A61B 5/7475; G06F 3/011; G06F 17/30781; H04M 1/72544; H04M 2250/12; H04M 1/72563; H04M 1/27455; H04M 1/575; H04M 1/576; H04M 1/6091; H04M 1/72572; H04M 2250/74; H04L 2209/80; H04L 29/06027; H04L 41/22; H04L 63/0263; H04W 4/00; H04W 4/023; H04W 4/08; H04W 4/20; H04W 88/02; H04W 8/24

USPC .......... 455/466, 419, 566; 345/473; 715/706, 715/762
See application file for complete search history.

(56) References Cited

U.S. PATENT DOCUMENTS

| | | | |
|---|---|---|---|
| 2005/0169446 A1* | 8/2005 | Randall et al. ............. | 379/93.23 |
| 2005/0171997 A1* | 8/2005 | Seo et al. ....................... | 709/202 |
| 2005/0264647 A1* | 12/2005 | Rzeszewski et al. ....... | 348/14.02 |
| 2006/0142068 A1* | 6/2006 | Reponen et al. ............. | 455/566 |

(Continued)

OTHER PUBLICATIONS

Arrington, M., "Ning Launches Slick New Mobile Social Tool Called Mogwee", in TechCrunch (http://techcrunch.com/2011/02/28/ning-launches-slick-new-mobile-social-tool-called-mogwee), Feb. 28, 2011, pp. 1-8.

(Continued)

*Primary Examiner* — Nimesh Patel
(74) *Attorney, Agent, or Firm* — Gard & Kaslow LLP

(57) ABSTRACT

A system and method are described herein that allow computing device users to convey emotional expressions graphically to other computing device users during a text messaging session. During the text messaging session, users run a text messaging application on their respective computing devices, each storing in memory a library of graphical expressions. A sender transmits a graphical expression by triggering a sensor which causes an expression command to be sent to the recipient. The expression command identifies for the application running on the recipient's computing device the graphical expression to retrieve from the memory of the recipient's computing device. The graphical expression is then displayed on the recipient's computing device using avatars that represent the sender and the recipient.

22 Claims, 13 Drawing Sheets

(56) References Cited

U.S. PATENT DOCUMENTS

2006/0294465 A1* 12/2006 Ronen et al. .................. 715/706
2012/0260263 A1* 10/2012 Edoja ............................ 719/313

OTHER PUBLICATIONS

Unknown, "Instant Messaging", in Wikipedia (http://en.wikipedia.org/wiki/Instant_messaging), archived Nov. 6, 2010, pp. 1-15.

Unknown, "SuperPoke!", in Wikipedia (http://en.wikipedia.org/wiki/SuperPoke), Oct. 15, 2011, pp. 1-2.

Unknown, Nudge (instant messaging), in Wikipedia (http://en.wikipedia.org/wiki/Nudge_(instant_messaging), Feb. 24, 2011.

Monitzer, A., "XEP-0224: Attention", in XMPP Standards Foundation website (http://xmpp.org/extensions/xep-0224.html), Nov. 13, 2008, pp. 1-8.

* cited by examiner

FIGURE 12
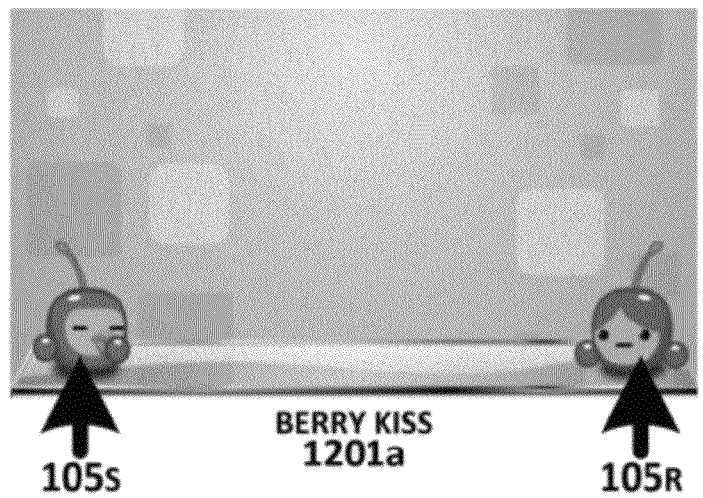
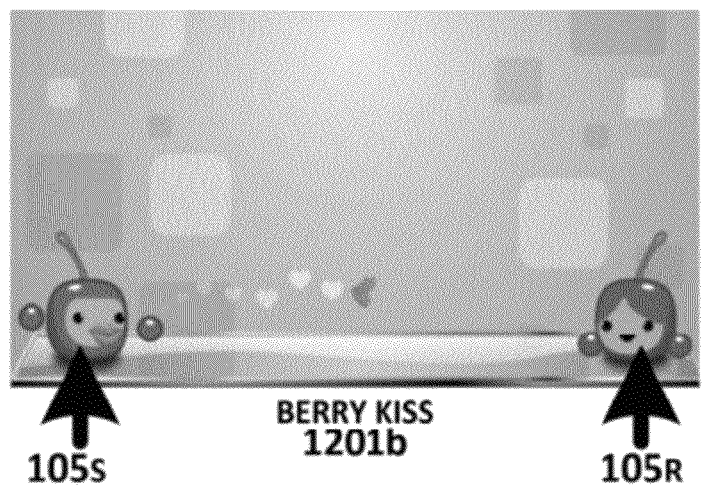
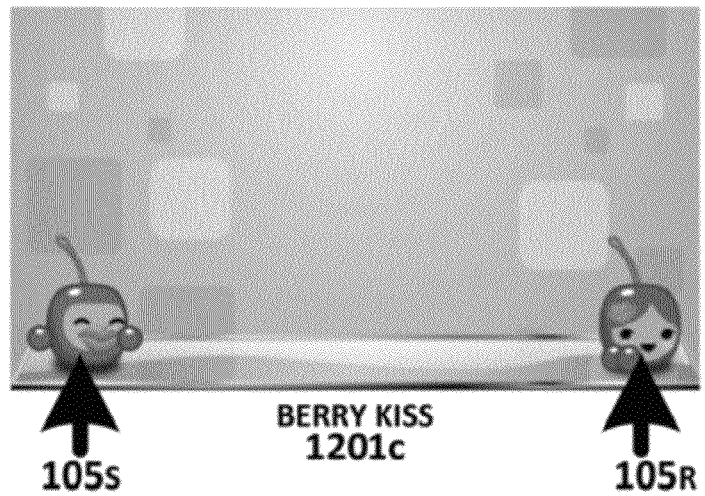

SYSTEM AND METHOD FOR GRAPHICAL EXPRESSION DURING TEXT MESSAGING COMMUNICATIONS

CROSS-REFERENCE TO RELATED APPLICATIONS

This application claims the benefit of U.S. Provisional Patent Application No. 61/477,605 filed on Apr. 21, 2011 and entitled "Expression/Emoticon System Using Mobile Smart Phones, Tablets and Computers During Chatting and Text Messaging Communication," incorporated herein by reference in its entirety.

BACKGROUND OF THE INVENTION

1. Field of the Invention

The present invention relates generally to text messaging communications, and more particularly, to graphical expression during text messaging communications.

2. Description of the Prior Art

Text messaging refers to the exchange of brief written messages over a network between phones and/or computing devices. Mobile instant messaging (MIM) technology extends text messaging service accessibility to mobile computing platforms (e.g., standard mobile phones, smartphones, and electronic tablets). With MIM technology, instant messaging services can be accessed from computing devices, including standard mobile phones and smartphones using a myriad of operating systems.

In text messaging, whether fixed-line or mobile, real-time text messages are communicated directly between individuals using computing devices (e.g., personal computers or mobile phones). Two types of text messaging are instant messaging and online chat. Although qualitatively similar, instant messaging is used in common parlance to refer to communications between known users (e.g., using a contact list or a friend list) whereas online chat is used to refer to communications among anonymous users in a multi-user environment.

Both instant messaging and online chat use a push-based style of internet communication. As with email, a user types in text that is transferred over a network (e.g., the Internet) to another user. Text messages between users are perceived to be quasi-synchronous—that is, to occur nearly simultaneously. This near-simultaneity is due to a push-based style of interne communication (i.e., communications are "pushed" to recipients by a central server when received) which allows immediate acknowledgement of, or reply to a message and makes text messaging an efficient and effective means of communication between users.

One inherent limitation of text messages is that each message is limited to 160 bytes of data (although some providers reserve some of those bytes for service use), or approximately 160 alphanumeric characters of the English alphabet. This size limitation severely restricts the type of data that can be transmitted via text message. As a result, graphical expression in text messages has been limited to one or more textual emoticon composed of alphanumeric symbols (e.g., a colon and a right parenthesis to symbolize a happy face, or a smiley face included within a font set), an attached graphic image file (e.g., a .GIF file of a winking smiley face or a flash animation of kissing lips), or a simple descriptive statement of an imaginary graphic action ("John has thrown a cow at you."). Because these graphical options are limited, the ability to effectively express emotion within text messages is minimal, at best.

Prior art messaging systems do allow the user to upload a personal picture and/or a tag phrase (or sentence) to his profile which is/are seen by other users during messaging sessions. The personal picture and tag phrase offer the user an opportunity to express a snapshot of his thoughts and/or mental state—at least from the instant in time that the profile was created—to others with whom he is communicating. Current messaging systems, at most, have the capacity to allow the user to change his associated profile picture during the text messaging session. Although the user can change his profile picture to express a different state or impression, the change is implemented by uploading a new picture outside of the text messaging session.

SUMMARY

In one embodiment is a method of sending a graphical expression during a text messaging session comprising: receiving user input on a first computing device, the user input specifying a graphical expression mode; determining, by analyzing data from one or more sensor of the first computing device, that the graphical expression of the specified graphical expression mode is to be performed; and transmitting an expression command from the first computing device to a second computing device through a network during a communication between the first computing device and the second computing device governed by a text messaging protocol, the expression command identifying the graphical expression to be performed on the second computing device.

In another embodiment is a method of receiving a graphical expression during a text messaging session comprising: receiving an expression command at a second computing device through a network from a first computing device during a communication established between the first computing device and the second computing device governed by a text messaging protocol, the expression command identifying the graphical expression to be performed on the second computing device; retrieving from memory of the second computing device the graphical expression specified by the expression command; and executing the retrieved graphical expression on the second computing device.

In yet another embodiment is a computing device to send a graphical expression during a text messaging session comprising: a microprocessor; one or more sensor; and a communication module, wherein the microprocessor is configured to receive user input specifying a graphical expression mode; determine, based on input from the one or more sensor, that the graphical expression of the specified graphical expression mode is to be performed; and transmit to another computing device an expression command identifying the graphical expression to be performed on the another computing device by using the communication module to communicate with the another computing device through a network during a communication governed by a text messaging protocol.

In another embodiment is a computing device to display a graphical expression received during a text messaging session comprising: a microprocessor and a communication module, wherein the microprocessor is configured to receive an expression command identifying the graphical expression to be displayed from another computing device, the command expression received by using the communication module to communicate with the another computing device through a network during a communication governed by a text messaging protocol; retrieve the graphical expression specified by the expression command; and execute the graphical expression.

In still another embodiment is a non-transitory computer readable medium having stored thereupon computing instructions comprising: a code segment to receive user input on a first computing device, the user input specifying a graphical expression mode; a code segment to determine, by analyzing data from one or more sensor of the first computing device, that a graphical expression of the specified graphical expression mode is to be performed; a code segment to transmit an expression command from the first computing device to a second computing device through a network during a communication established between the first computing device and the second computing device governed by a text messaging protocol, the expression command identifying the graphical expression to be performed on the second computing device; a code segment to receive the expression command at the second computing device through the network from the first computing device during the communication established between the first computing device and the second computing device governed by the text messaging protocol, the expression command identifying the graphical expression to be performed on the second computing device; a code segment to retrieve from memory of the second computing device the graphical expression specified by the expression command; and a code segment to execute the retrieved graphical expression on the second computing device.

BRIEF DESCRIPTION OF DRAWINGS

FIG. 12 shows several frames of one animation sequence that can be delivered during the text messaging session according to one embodiment.

DETAILED DESCRIPTION OF THE INVENTION

Described herein are a system and method to convey graphical expression during an e-conversation, as for example, during an instant messaging session, an online chat session, or other text messaging session. These graphical expressions can be transmitted between/among text messaging application users to convey the emotional state of one or more party to the e-conversation, and can be presented through avatars representing participants in the e-conversation. Each avatar serves as an animated emoticon that can rapidly reflect (in real-time) the associated user's emotional state—without any textual explanation of that emotional state being communicated between messaging participants. As one example, one application user can express displeasure with another annoying application user by sending an animated graphical expression in which an avatar representing the displeased user activates a magic wand, waves the magic wand at an avatar representing the annoying user, casts a spell, and turns the avatar representing the annoying user into a frog.

One embodiment of the system and method described herein allows the user to add, modify, and/or change his avatar at will within the messaging session, thereby expanding the messaging into a non-verbal expression realm. For example, if the user is sad, his avatar can have a sad face. When one logs in to chat with this user, one can immediately see that the user's avatar is crying—even before any textual data are exchanged. As another example, if the user is going to a prom night party, she might accessorize her avatar with white gloves, a white body color, and a tiara, and change the avatar facial expression to a happy face. This customization can be accomplished without removing and uploading a new picture, and provides a unique non-verbal means for instant messaging users to convey information about their mood before and/or during textual conversations.

Figure 1:
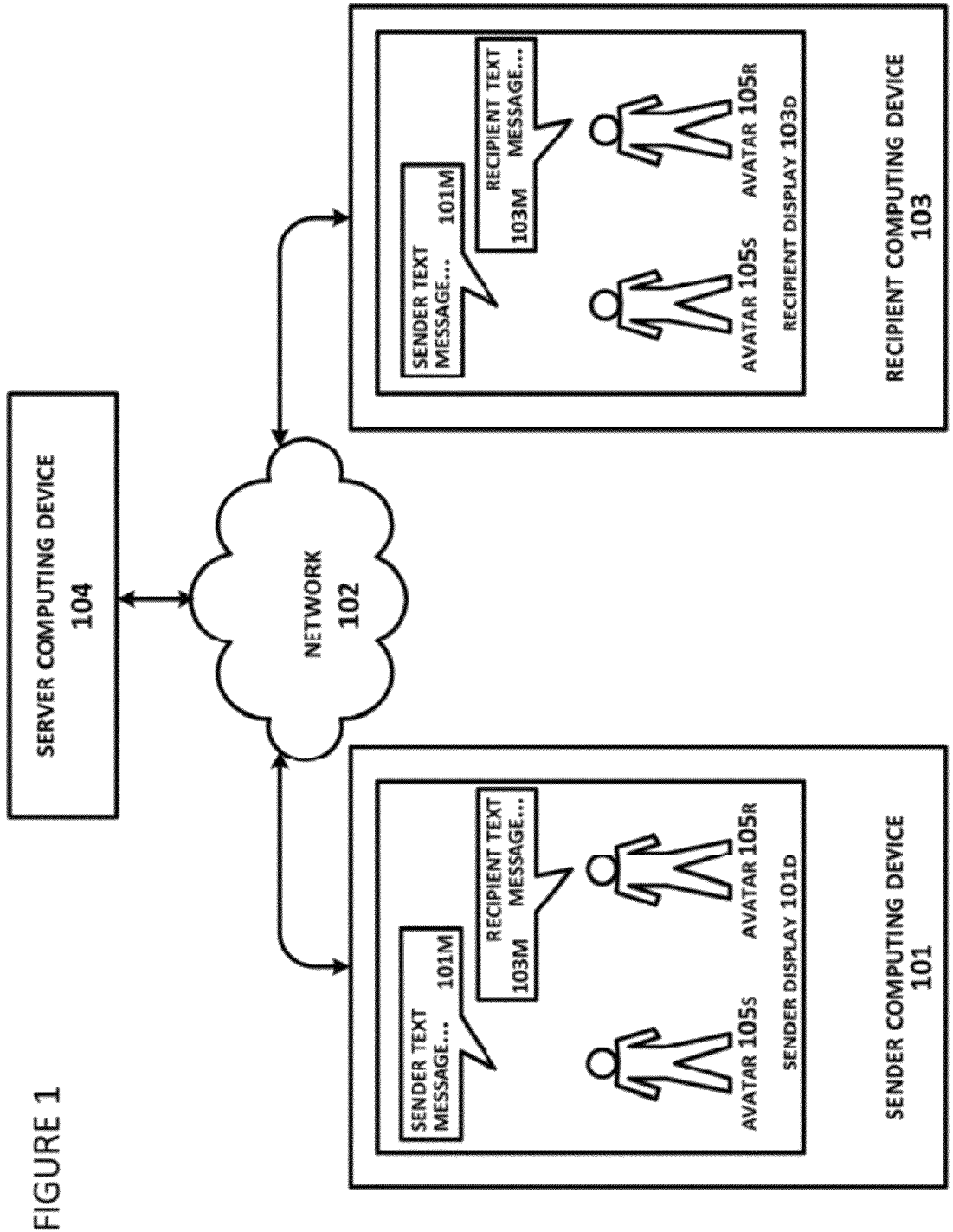
FIG. 1 is a block diagram of one embodiment of a system for graphical expression during a text messaging session.

FIG. 1 is a block diagram of one embodiment of the system described herein for graphical expression during text messaging communications. A sender computing device 101 is coupled through network 102 to communicate with recipient computing device 103 during the text messaging communication (e.g., instant messaging or online chat) session governed by a text messaging protocol. Both sender computing device 101 and recipient computing device 103 are also connected through network 102 to a server computing device 104 (preferably a server) to obtain graphical expressions (e.g., graphical images, text, or graphical animations). Once obtained, these graphical expressions are stored locally and associated with an application within sender computing device 101 and recipient computing device 103 to be retrieved on-demand for display as graphical expressions on either device as explained further herein. The application can be a standalone application or a browser-based application.

Figure 2:
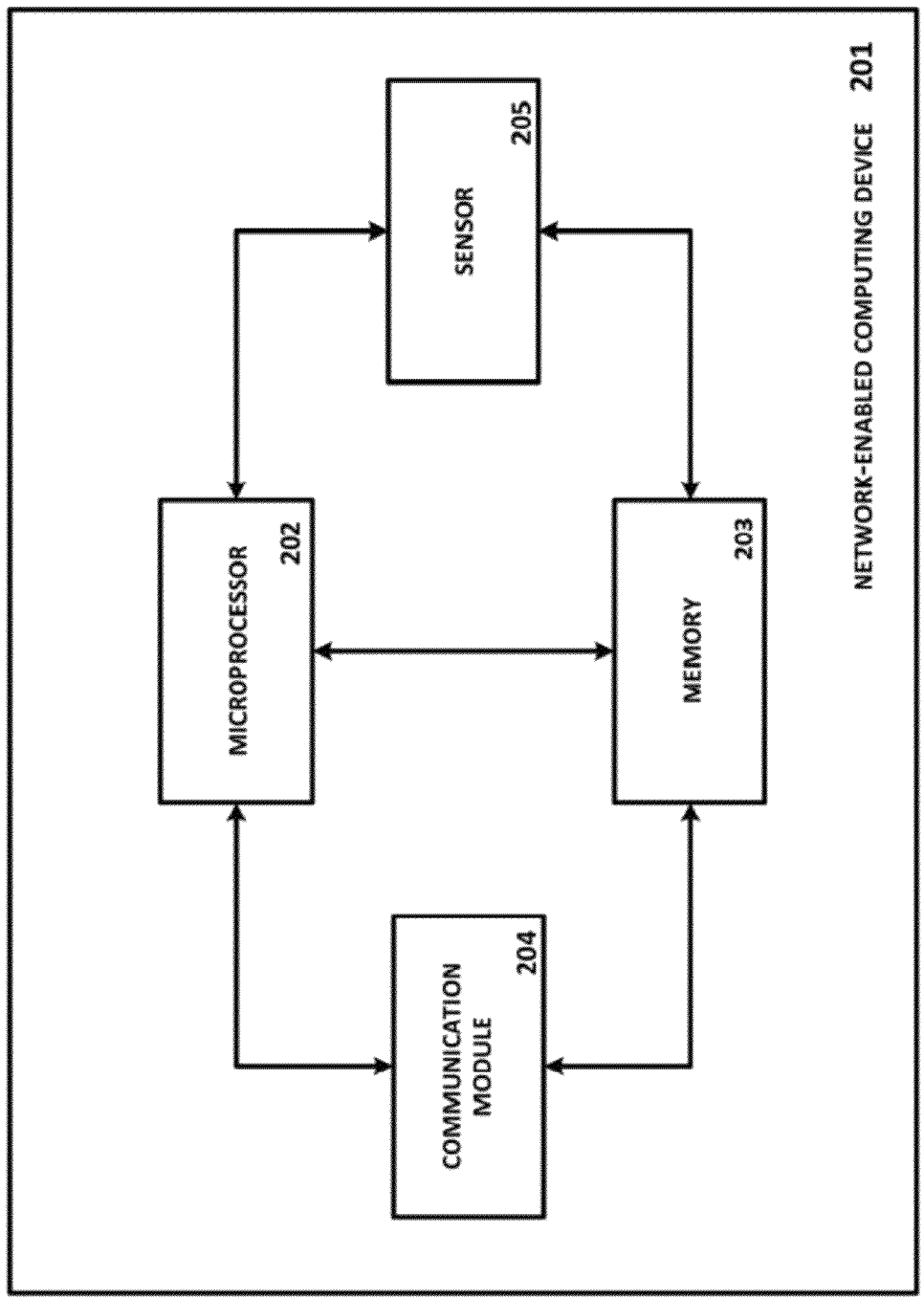
FIG. 2 is a block diagram of one embodiment of a network-enabled computing device.

One of skill in the art will recognize that sender computing device 101 and recipient computing device 103 can be identical devices or different types of devices. Sender computing device 101 and recipient computing device 103 are preferably smartphones (such as the iPhone from Apple, Inc., a BlackBerry device from Research in Motion Limited, or a phone running the Android OS from Google, Inc. of Mountain View, Calif.), although each can be a home personal computer (PC), a corporate PC, a laptop, a netbook, or, as shown in FIG. 2, any network-enabled computing device 201 comprised of a microprocessor 202 (to execute processing logic according to various method steps discussed herein), memory 203 (to store expression commands and graphical expressions as discussed herein), a communication module 204 (to communicate with network 102 and computing devices (e.g., sender computing device 101 or recipient computing device 103) as discussed herein), and one or more sensor 205 (as discussed herein). Examples of network-enabled computing device 201 include a cellular phone, personal digital assistant (PDA), media device (such as the iPod or iPod Touch from Apple, Inc.), electronic tablet (such as an iPad from Apple, Inc., or the HP Slate from Hewlett-Packard Development Company, L.P.), or an electronic reader device (such as the Kindle or Kindle DX from Amazon.com, Inc. of Seattle, Wash., or The Reader from SONY Electronics Inc.). Sensor 205 can be one or more of the following: a touch pad or screen, an accelerometer, a gyroscope, a microphone, a light sensor, a proximity sensor, a camera, a button, a keyboard key, a GPS, or third-party software triggering or simulating one or more of these sensors. The application user excites one or more of these sensors, as for example, by touching the touch screen to perform a certain gesture, shaking sender computing device 101, holding computing device 101 close to the user's chest (to activate the proximity sensor), or providing input (blowing or speaking) to the microphone.

One of ordinary skill in the art will further understand that network 102 can be the Internet, a combination of wired and/or wireless networks, a wide area network (WAN), a local area network (LAN), a global area network (GAN), a virtual private network (VPN), a personal area network (PAN), an enterprise private network, or any similar network now known or later developed. One of ordinary skill in the art will further understand that each network connection can be, without limitation, an integrated services digital network (ISDN), a broadband ISDN (B-ISDN), a digital subscriber line (ADSL, ADSL+2), a symmetric digital subscriber line (SDSL), a very high speed DSL (VDSL), cable, cellular telephone, wireless, a broadband Internet connection, a T-1 line, a bonded T-1 line, a T-3 line, an optical carrier level 3 (OC3), a satellite, or any other form of network connection now known or later developed.

During the text messaging session of the system and method described herein, the application for graphical expression is running on sender computing device 101 and a separate copy of the application is running on recipient computing device 103. The graphical expression application is a text messaging communication application capable of sending and receiving graphical expressions.

Sender computing device 101 and recipient computing device 103 each have a display screen (sender display screen 101D and recipient display screen 103D, respectively) upon which text and/or graphical expression can be displayed during the messaging communication session.

As text messages are sent and received during the text messaging session, they are displayed in real-time on each device display screen. Thus, when sender computing device 101 sends a text message to recipient computing device 103, sender text message 101M appears on sender display 101D and on recipient display 103D. When recipient computing device 101 sends a text message (e.g., a reply), recipient text message 103M also appears on each device display. The incoming and outgoing messages are moved off each display screen as additional messages are sent or received.

In one embodiment, when the text messaging application is running, a sender avatar 105S is displayed on one side of sender display screen 101D (e.g., left side of the display screen) and intended to represent the application user on sender computing device 101. A recipient avatar 105R is displayed on the other side of sender display screen 101D (e.g., right side of the display screen) and intended to represent the application user on recipient computing device 103. Likewise, sender avatar 105S and recipient avatar 105R are both displayed on recipient display screen 103D. In one embodiment, sender avatar 105S is displayed on the left side of sender display screen 101D and the right side of recipient display screen 103D, whereas recipient avatar 105R is displayed on the right side of sender display screen 101D and the left side of recipient display screen 103D. In another embodiment, as shown in FIG. 1, sender avatar 105S is displayed on the left side of both device displays (101D and 103D) whereas recipient avatar 105R is displayed on the right side of both device displays (101D and 103D).

Both avatars 105S and 105R are preferably displayed on each device screen during the text messaging session, although one of skill in the art will understand that the graphical expression may have only one avatar shown on each screen (e.g., sender avatar 105S may be alone on sender display screen 101D during the graphical expression and recipient avatar 105R may be alone on the recipient display screen 103D).

Sender avatar 105S and recipient avatar 105R can interact on computing device displays 101D and 103D so as to represent emotions being conveyed from one application user (on sender computing device 101) to another application user (on recipient computing device 103). For example, one application user on sender computing device 101 can express displeasure with another annoying application user on recipient computing device 103 by sending an animated graphical expression in which sender avatar 105S (representing the displeased user) activates a magic wand, waves the magic wand at recipient avatar 105R (representing the annoying user), casts a spell, and turns recipient avatar 105R into a frog.

Figure 3:
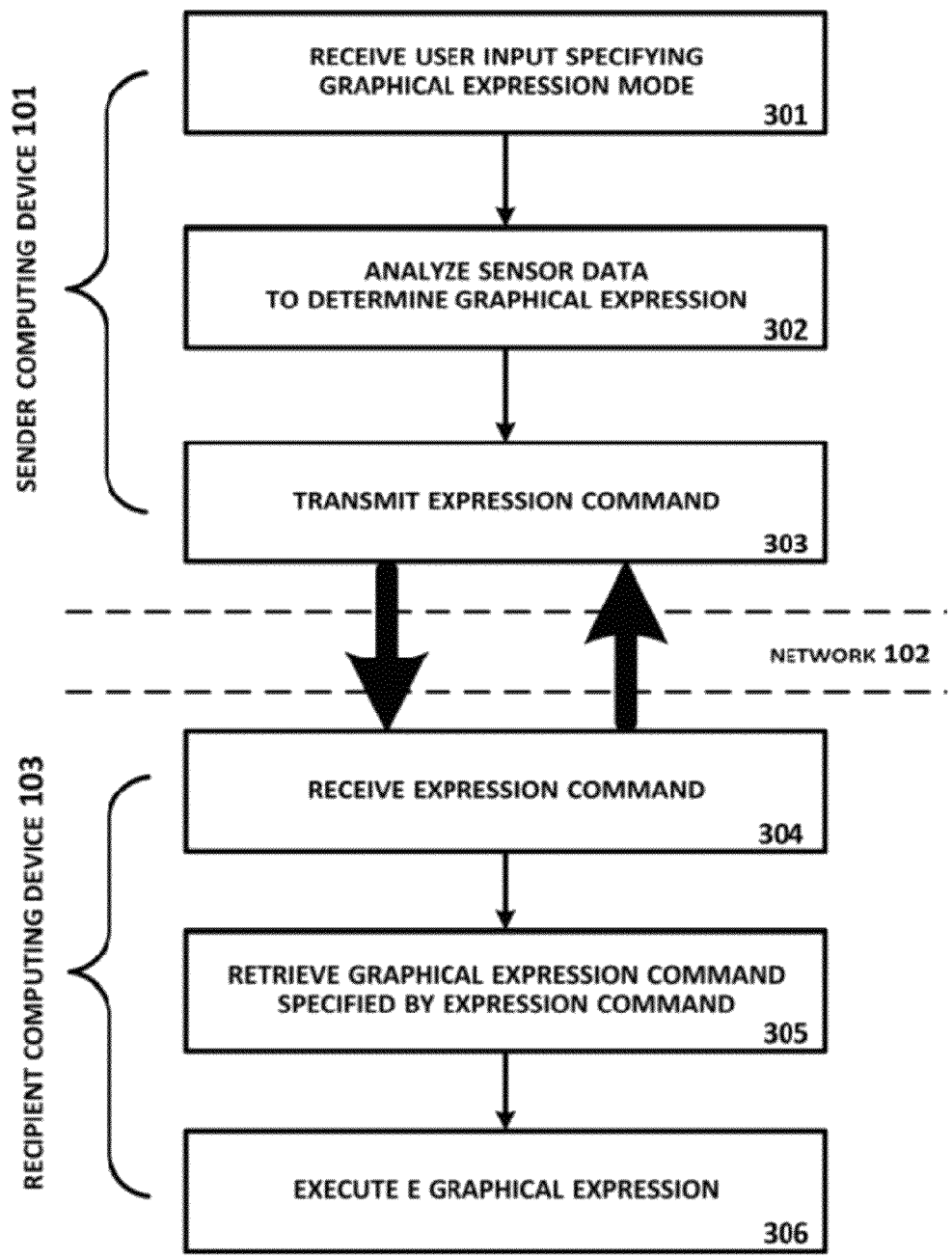
FIG. 3 is a flow chart depicting a method for communicating graphical expression during the text messaging session according to one embodiment.

A flowchart detailing the method of communicating the graphical expression during the text messaging session according to one embodiment is detailed in FIG. 3. In step 301, sender computing device 101 receives input from the application user specifying a desired graphical expression mode. As is known in the art, mode selection is commonly used in computing device interfaces to limit or specify how user input is interpreted to be a specific command. Various graphical expression modes are possible (e.g., blowing a kiss, blowing smoke, or sending a water balloon).

In step 302, a mode selection causes the application to attend for a given period of time to data from the one or more sensor 205 associated with the mode selection. The one or more sensor 205 is associated with the graphical expression mode such that the manner of activation of the one or more sensor metaphorically performs the graphical expression. As an example, the user can select the graphical expression mode of sender avatar 105S throwing ninja stars at recipient avatar 105R. Once that graphical expression mode has been selected, the user can move sender computing device 101 as if throwing the device (i.e., so that the movement of sender computing device 101 by the application user metaphorically represents throwing the ninja stars). The application running on sender computing device 101 then analyzes data from the one or more sensor 205 associated with the mode selection to determine whether the sensor data match a data definition for the graphical expression. If the data match the data definition for the graphical expression, then that graphical expression is identified as the graphical expression of the graphical expression mode to be performed on recipient computing device 103.

In step 303, once the graphical expression is determined, the application running on sender computing device 101 transmits an expression command that specifies that graphical expression from sender computing device 101 across network 102 to recipient computing device 103. Because both sender computing device 101 and recipient computing device 103 are each separately running a copy of the same application, sender computing device 101 can transmit the expression command rather than send file attachments with videos (e.g., animations) that are to be displayed or commands to regenerate avatars and graphical expressions de novo.

Figure 4:
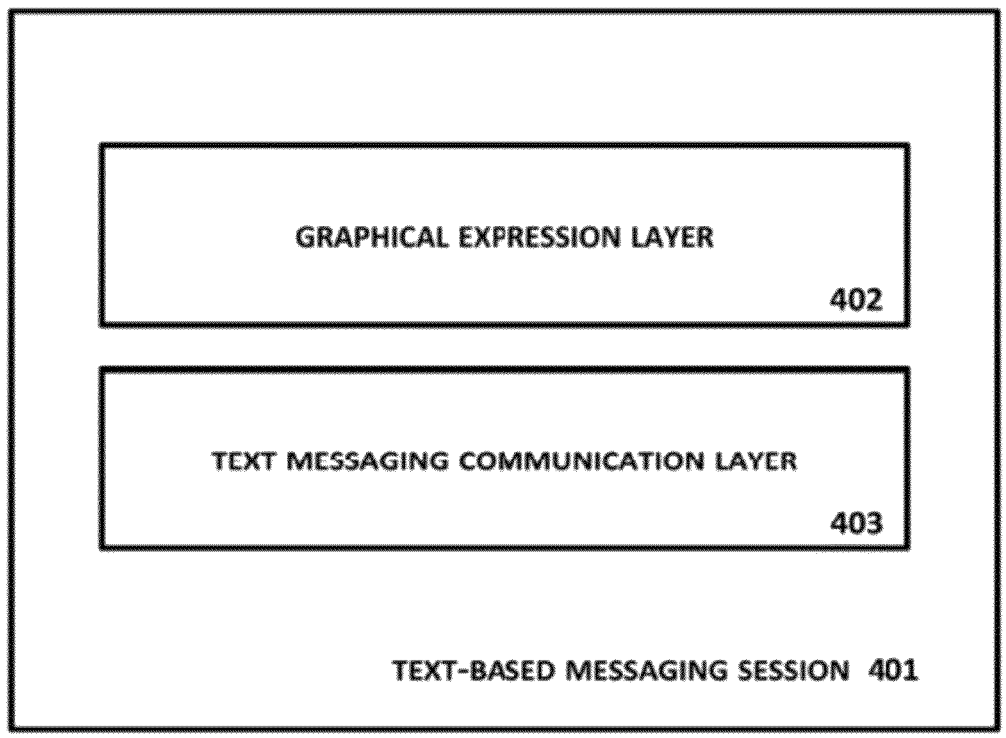
FIG. 4 depicts the text messaging session according to one embodiment in which graphical expressions and text messages can be communicated as separate layers during the text messaging session.

The expression command is preferably transmitted in a standard extensible markup language (XML) message format (as discussed in greater detail below) and can be transmitted during a one-on-one text messaging session or during a one-to-many synchronous or asynchronous text messaging session. FIG. 4 schematizes how the graphical expression is transmitted between computing devices. During the text messaging session 401, text messages are conveyed between sender computing device 101 and recipient computing device 103 in a text messaging communication layer 403 according to the text messaging protocol. Graphical expression command identifiers are communicated during the same messaging session, but, in one embodiment, are transmitted asynchronously in a graphical expression layer 402 separate from the text messaging communication layer 403 using known messaging communication protocols.

Referring again to FIG. 3, in an alternate embodiment, a pointer can be used to identify a file on recipient computing device 103 containing the graphical expression to be displayed. In this embodiment, the pointer is transmitted in step 303 instead of the expression command.

In step 304, recipient computing system 103 receives the expression command across network 102 from sender computing system 101.

In step 305, the application running on recipient computing system 103 uses the received expression command to locate and retrieve the specified graphical expression stored on recipient computing device 101. Because both sender computing device 101 and recipient computing device 103 are each separately running a copy of the same application, the expression command can be used by the application running on recipient computing device 103 to identify the file stored on recipient computing device 103 that contains the graphical expression to be displayed. Thus, recipient computing device 103 need not open file attachments with videos (e.g., animations) to be displayed nor regenerate avatars and graphical expressions de novo whenever receiving the expression command for the graphical expression from sender computing device 101.

In step 306, the application running on recipient computing system 103 executes the retrieved specified graphical expression which then appears on recipient display 103D.

The graphical expression can likewise be executed, in one embodiment, on sender computing device 101 at any point in time after the graphical expression is determined in step 302.

In an alternate embodiment, inputs can be performed by voice recognition software. Thus, in step 301, user verbal input can be used to select the graphical expression mode. And, in step 302, user verbal input may be used in lieu of input from one or more sensor 205. In both instances, the verbal input is speech that has been recognized by a speech recognition module which may be contained within sender computing device 101. Alternatively, the verbal input is speech recognized by the speech recognition module and interpreted by a natural language processing module, either or both of which modules may be contained within sender computing device 101.

As discussed above regarding step 303, the XML message format is used to transmit graphical expression information from sender computing device 101 to recipient computing device 103. This format offers the advantage that the graphical expression information can be incorporated with other communication services (e.g., open source standard Extensible Messaging and Presence Protocol (XMPP) or short message service (SMS) protocol), thereby permitting efficient transfer of graphical expression information during the same instant messaging session as normal messaging text, picture, video, and location data. The graphical expression information can include the avatar mood, the avatar appearance, one or more avatar accessory, and/or the avatar skills (i.e., one or more graphical expression). A sample XML message format is presented in FIG. 5.

Figure 5:
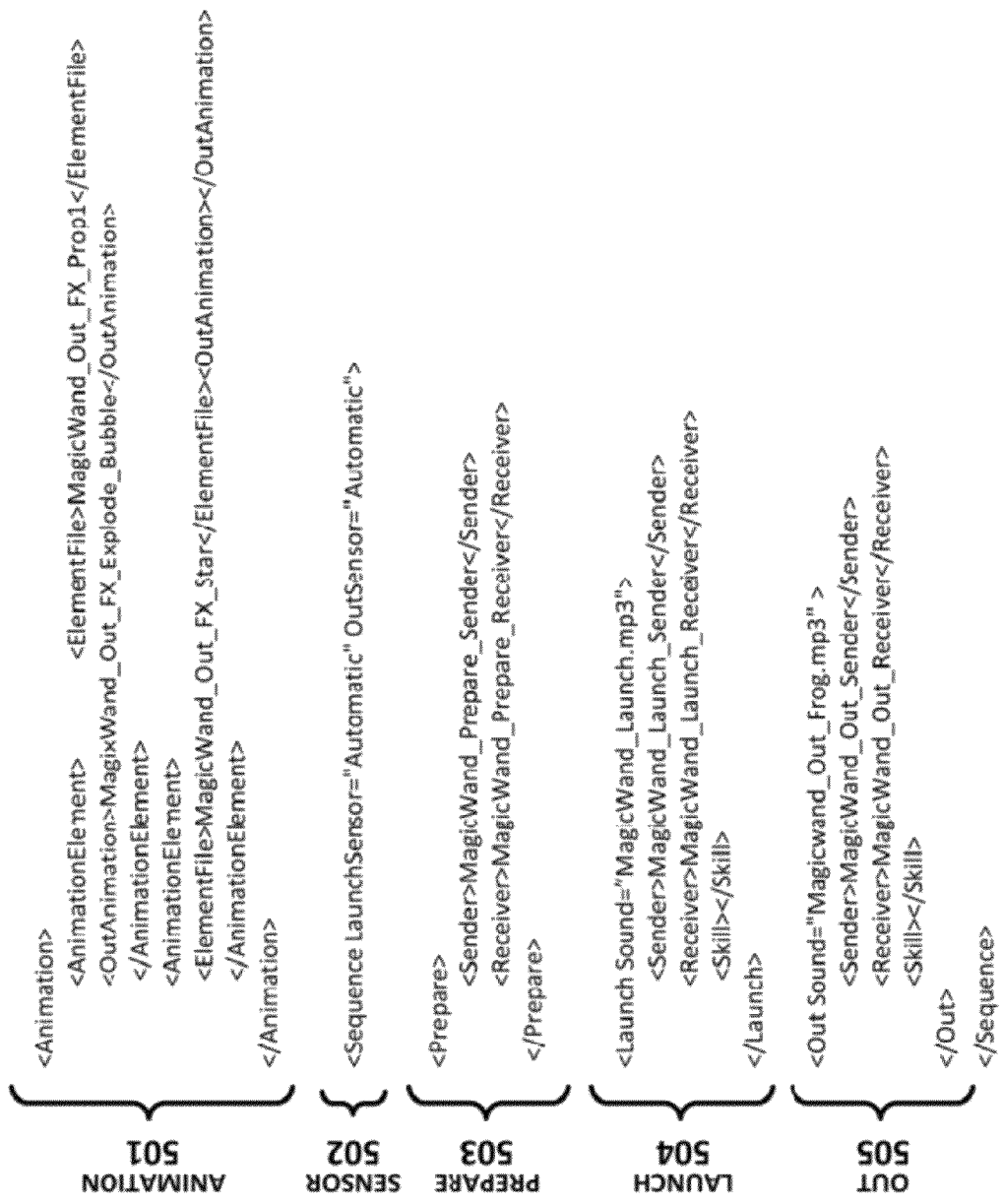
FIG. 5 is a sample XML message format used to transmit graphical expression information according to one embodiment.

As shown in FIG. 5, the XML message format is divided into code sections. In animation code 501, the skill animation to be used for the graphical expression is defined (e.g., in the sample code, waving a magic wand to turn recipient avatar 105R into a frog).

In sensor code 502, a termination sensor is defined to be used to terminate and/or remove the graphical expression animation from recipient computing device 103 (e.g., touch pad ("touch"), accelerometer and/or gyroscope ("shake"), and microphone ("blow") in this example), and the trigger sensor to be used to launch the skill animation is defined (e.g., touch pad ("touch"), accelerometer and/or gyroscope ("shake"), and microphone ("blow")).

In prepare code 503, the skill animation is retrieved from recipient computing device 103.

Figure 11:
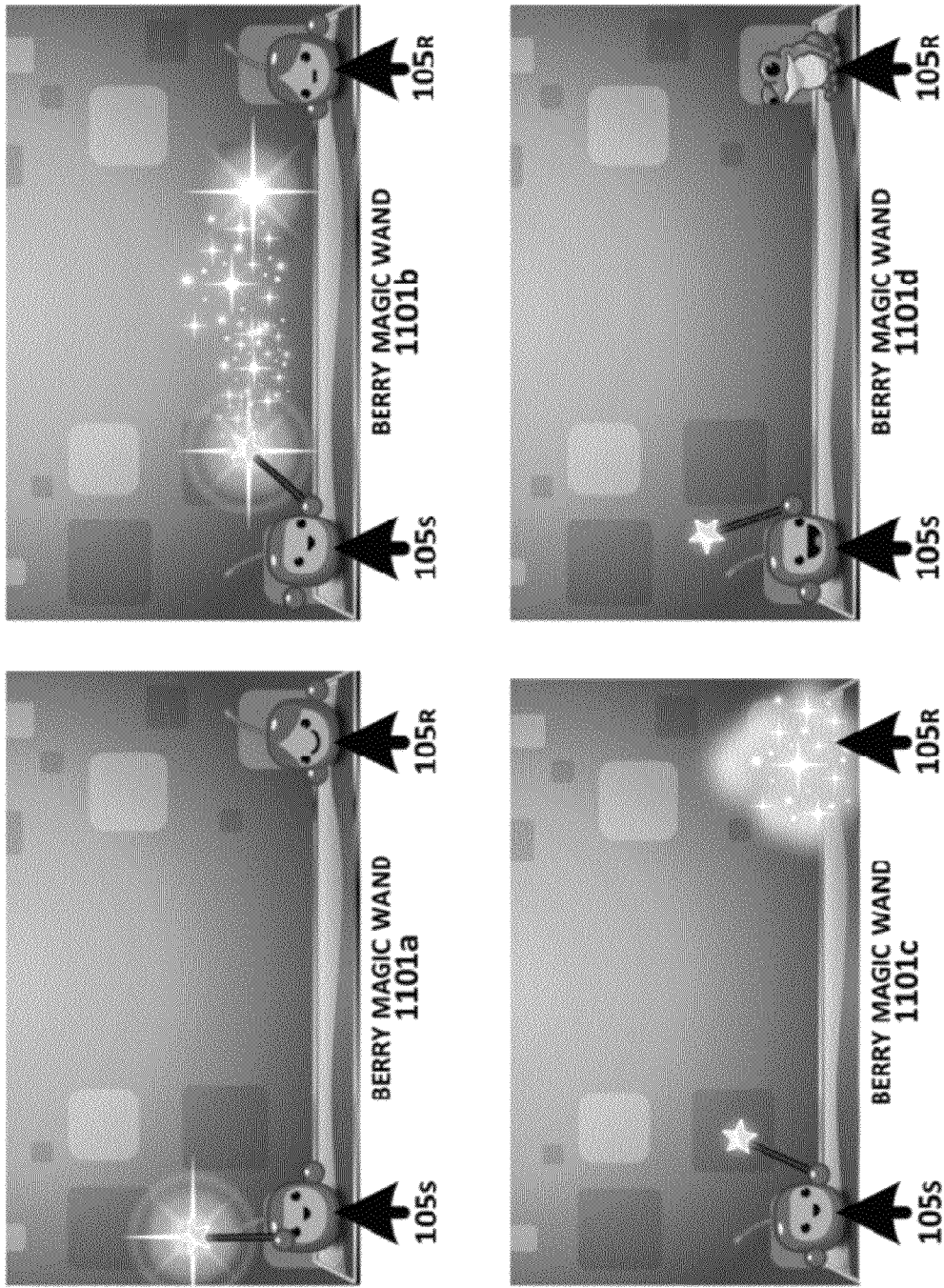
FIG. 11 shows several frames of one animation sequence that can be delivered during the text messaging session according to one embodiment.

In launch code 504, the skill animation is initiated by activation of the trigger sensor (e.g., in this example, the animation begins when one or more sensor is activated by touching, shaking, blowing). In this example (and as shown in FIG. 11), sender avatar 105S activates a magic wand (frame 1101a), waves the magic wand at recipient avatar 105R (frame 1101b), casts a spell on recipient avatar 105R (frame 1101c), and recipient avatar 105R turns into a frog (frame 1101d).

In out code 505, the animation on recipient computing device 103 is terminated. The animation disappears either by being timed-out or by a trigger of the sensor (e.g., shaking recipient computing device 103).

Figure 6:
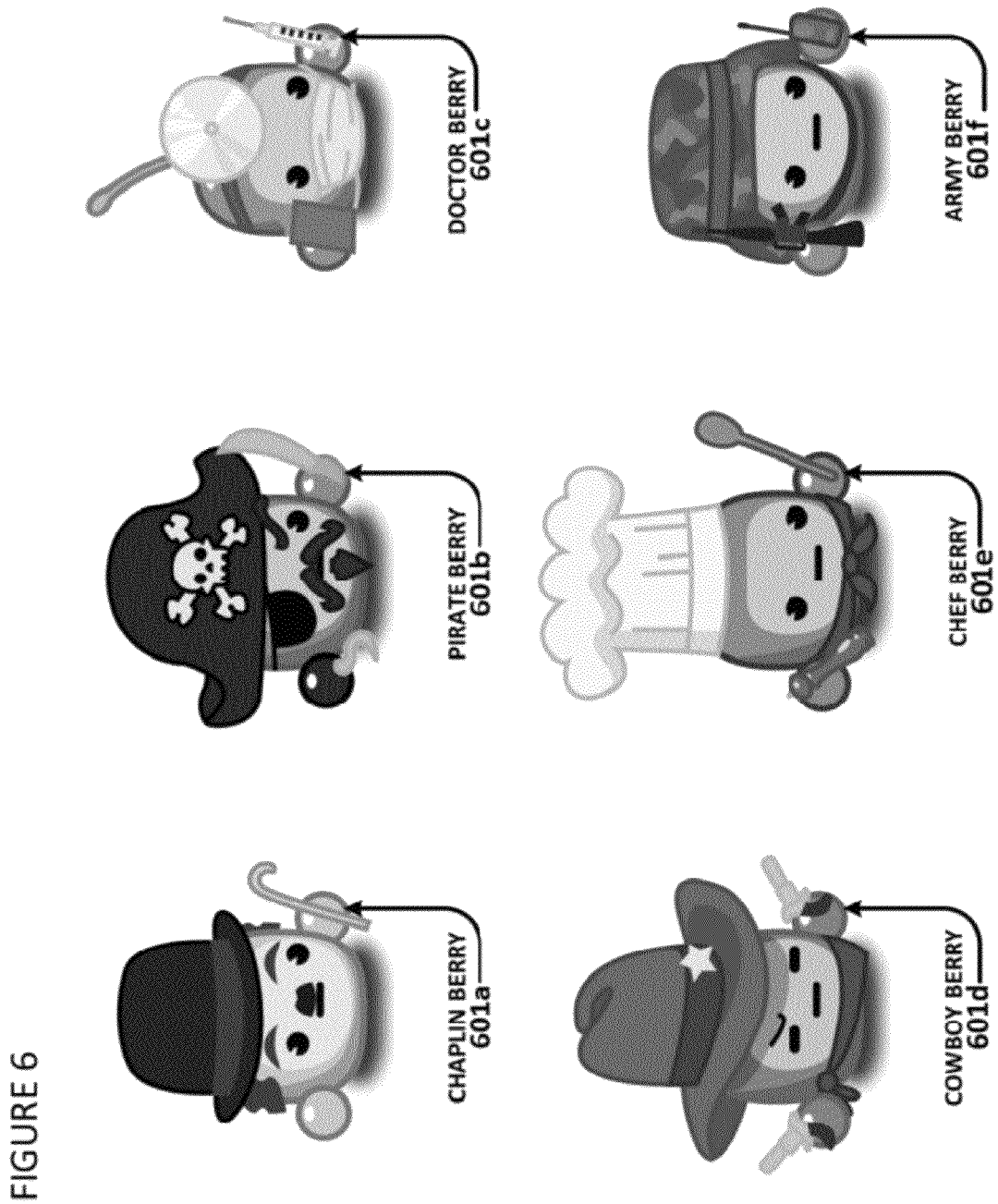
FIG. 6 illustrates exemplary avatar states that can be communicated during the text messaging session according to various embodiments.
Figure 7:
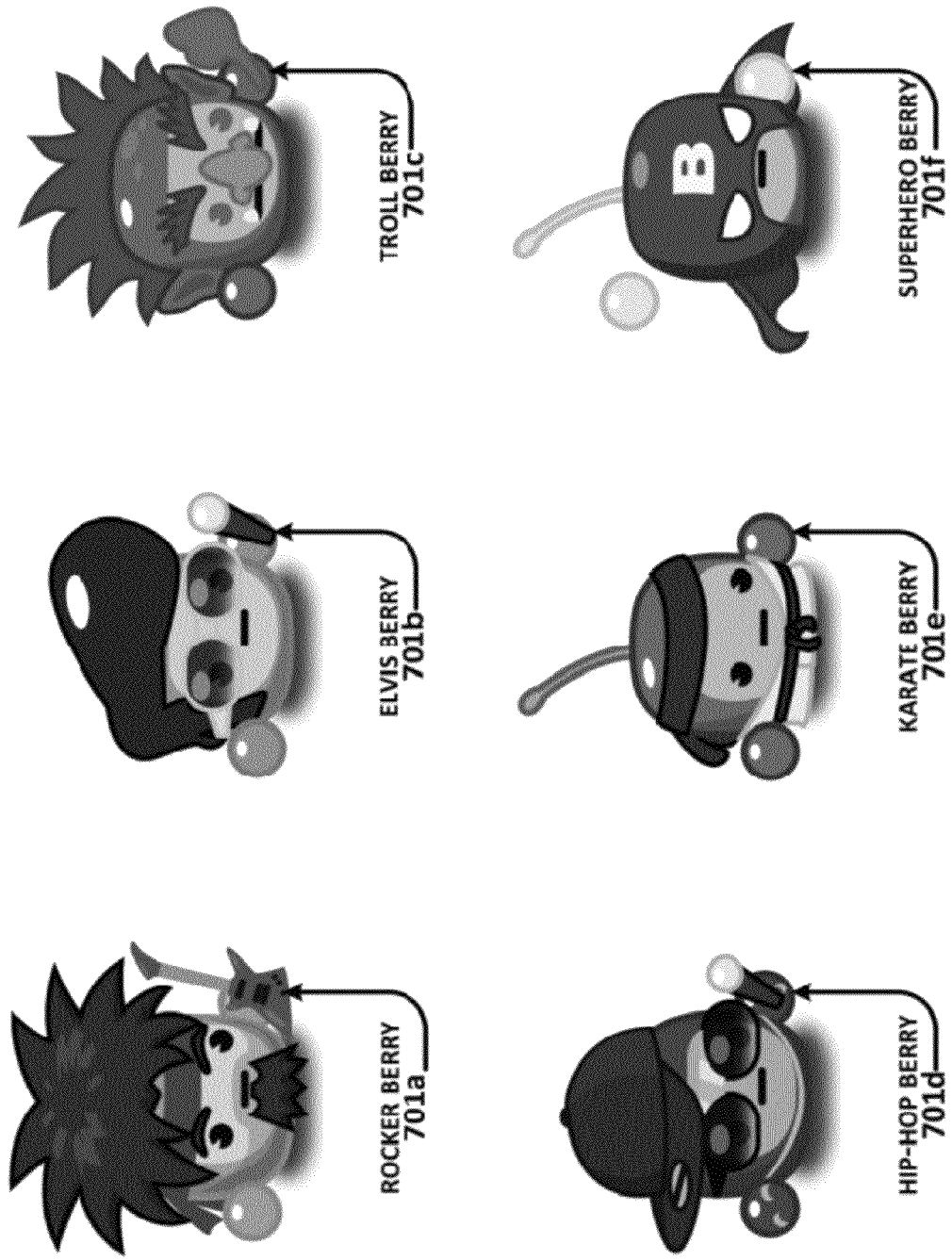
FIG. 7 illustrates exemplary avatar states that can be communicated during the text messaging session according to various embodiments.
Figure 8:
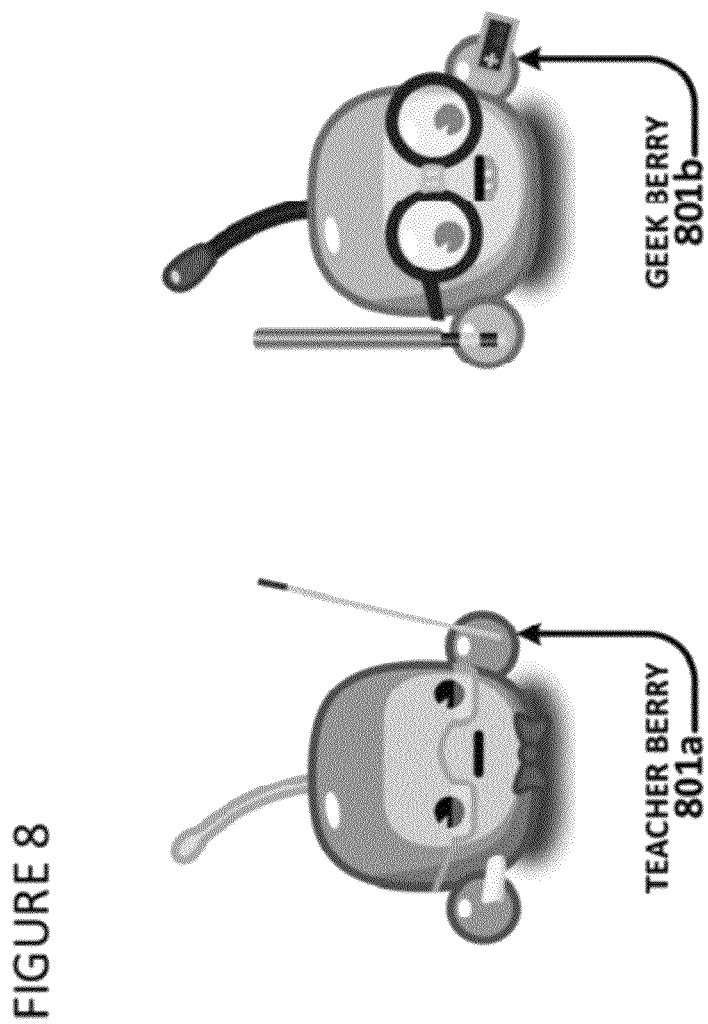
FIG. 8 illustrates exemplary avatar states that can be communicated during the text messaging session according to various embodiments.

Each avatar's appearance can be personalized by the application user it represents (i.e., avatar 105S can be personalized by the application user on sender computing device 101 and avatar 105R can be personalized by the application user on recipient computing device 103). One of skill in the art will understand that the avatar can be humanoid or otherwise, and can be cartoonish, realistic, or otherwise, including (as in the following examples), a cartoon fruit berry. The avatar can be personalized by changing its appearance, as illustrated in FIGS. 6, 7, and 8. Avatars can be provided with accessories such as, for example, headgear, eyeglasses, and tools (e.g., Chaplin Berry 601a, Pirate Berry 601b, Doctor Berry 601c, Cowboy Berry 601d, Chef Berry 601e, and Army Berry 601f in FIG. 6; see also Teacher Berry 801a and Geek Berry 801b in FIG. 8), as well as hairstyles, hair colors, and clothing as shown in FIG. 7 (Rocker Berry 701a, Elvis Berry 701b, Troll Berry 701c, Hip-Hop Berry 701d, Karate Berry 701e, and Superhero Berry 701θ. Avatars can also be personalized by, for example, facial features such as, for example, eyes, mouths, ears, facial hair (e.g., Teacher Berry 801a and Geek Berry 801b in FIG. 8; see also Rocker Berry 701a and Troll Berry 701c in FIG. 7; see also Cowboy Berry 601d in FIG. 6). Personalized avatars can be used to express the user's mood, as for example, a smiling avatar to express happiness, a frowning avatar to express sadness, or a winking avatar to express playfulness. The user's personalized avatar can be linked to the user's text messaging profile such that the user's personalized avatar is displayed as an identifier to other application users (in an analogous fashion to static photographs or pictures used in other applications such as Facebook® or LinkedIn®) to identify the user. Each user's avatar can be modified at will "on the fly" during the text messaging session (e.g., by changing the application user's profile) such that the user's avatar is modified in real-time on other users' devices.

Application users can acquire a portfolio of different skills which can be displayed as graphical expressions to other users during the text messaging session (as discussed above) as static graphic images, text, or animations. Application users preferably activate these skills to express emotional states to other users. A variety of emotions can be expressed graphically, including, without limitation, love, hate, disgust, amusement, admiration, boredom, adoration, displeasure, annoyance, surprise, frustration, fear, guilt, pride, jealousy, anxiety, pride, envy, shame, regret, sadness, happiness, joy, grief, appreciation, hope, enthusiasm, confidence, gratitude, trust, optimism, pessimism, trust, vulnerability, astonishment, appreciation, patience, impatience, depression, self-pity, resentment, worry, disbelief, denial, offendedness, and defensiveness.

Referring again to FIG. 1, the skills are preferably graphical expressions in the form of animations of sender avatar 105S performing an action on recipient avatar 105R (i.e., involving something being done by sender avatar 105S to recipient avatar 105R, e.g., sender avatar 105S punching recipient avatar 105R) or directed at recipient avatar 105R (i.e., involving something being done by sender avatar 105S that affects an area of recipient display 103D rather than changing the graphical image of recipient avatar 105R, e.g., sender avatar 105S blowing smoke which obscures recipient display 103D) during the text messaging session. Thus, graphical expressions can be from an avatar or to an avatar. In another embodiment, the skill can be performed on one's own avatar. For example, sender avatar 105S can eat a mushroom and become taller, or can eat spinach and become muscular. Skills can include graphical expressions of, without limitation, hugging, kissing, vomiting, farting, high five-ing, pillow-fighting, dancing, casting spells, throwing objects (e.g., snowballs, water balloons, ninja stars, water balloon, tomato, football), blowing (smoke, fire, soap bubbles, or bubblegum), silencing someone (e.g., zipping up an avatar), and boxing. Skills can also include projections of objects, such as a kiss from sender avatar 105S being projected as a lipstick impression of lips on recipient computing device 103, or love from sender avatar 105S being projected as a pulsating heart on recipient computing device 103. Skills can also include associated sounds to be played when the graphical expression is executed. Each skill is a static or dynamic (e.g., animated) graphical expression that is stored on each of the sender computing device 101 and recipient computing device 103, and retrieved on-demand to be displayed on sender computing device 101 and recipient computing device 103 (as discussed above with respect to FIG. 3). Thus, a particular skill is displayed when it is sent to the application user on any recipient computing device.

New skills are preferably provided by server computing device 104 to sender computing device 101 and recipient computing device 103 as updates to applications and/or become accessible to application users once purchased from an application store on server computing device 104. Thus, the application user who purchases new graphical expression A can convey commands for new graphical expression A to be displayed on recipient computing devices of other users (all of whom can view new graphical expression A), but users who have not purchased new graphical expression A cannot themselves convey commands to display new graphical expression A to other users.

The graphical expression transmitted to recipient computing device 103 can begin without additional user input if, for example, the application user on recipient computing device 103 is communicating with the application user on sender computing device 101 when the graphical expression is sent by the application user on sender computing device 101. Alternatively, graphical expressions displayed on recipient computing device 103 can require user input on recipient computing device 103 to allow the graphical expression to be displayed or to terminate the graphical expression. For example, the application user on recipient computing device 103, while communicating with one application user, can receive a notification within a messaging stream that another application user of sender computing device 101 has sent a graphical expression (e.g., "John sent smoke."). The application user on recipient computing device 101 can then click the notification to initiate the blowing smoke animation. After smoke covers the display of recipient computing device 101, the user may be required to rub the screen to erase the smoke display.

Other graphical expressions use sensor input on recipient computing device 103 to enhance the recipient application user's experience. For example, the user of sender computing device 101 can blow bubbles (through his avatar 105S) at the application user on recipient computing device 103 who can enjoy the graphical expression more by touching display screen 103D to activate one or more touch screen sensor which pops the displayed bubbles. Or, as another example, the user of recipient computing device 103 can receive the graphical expression of a burning fire (displayed as a static image or animation), and can blow into the microphone to activate one or more sensor 205 which extinguishes the displayed fire.

Figure 9:
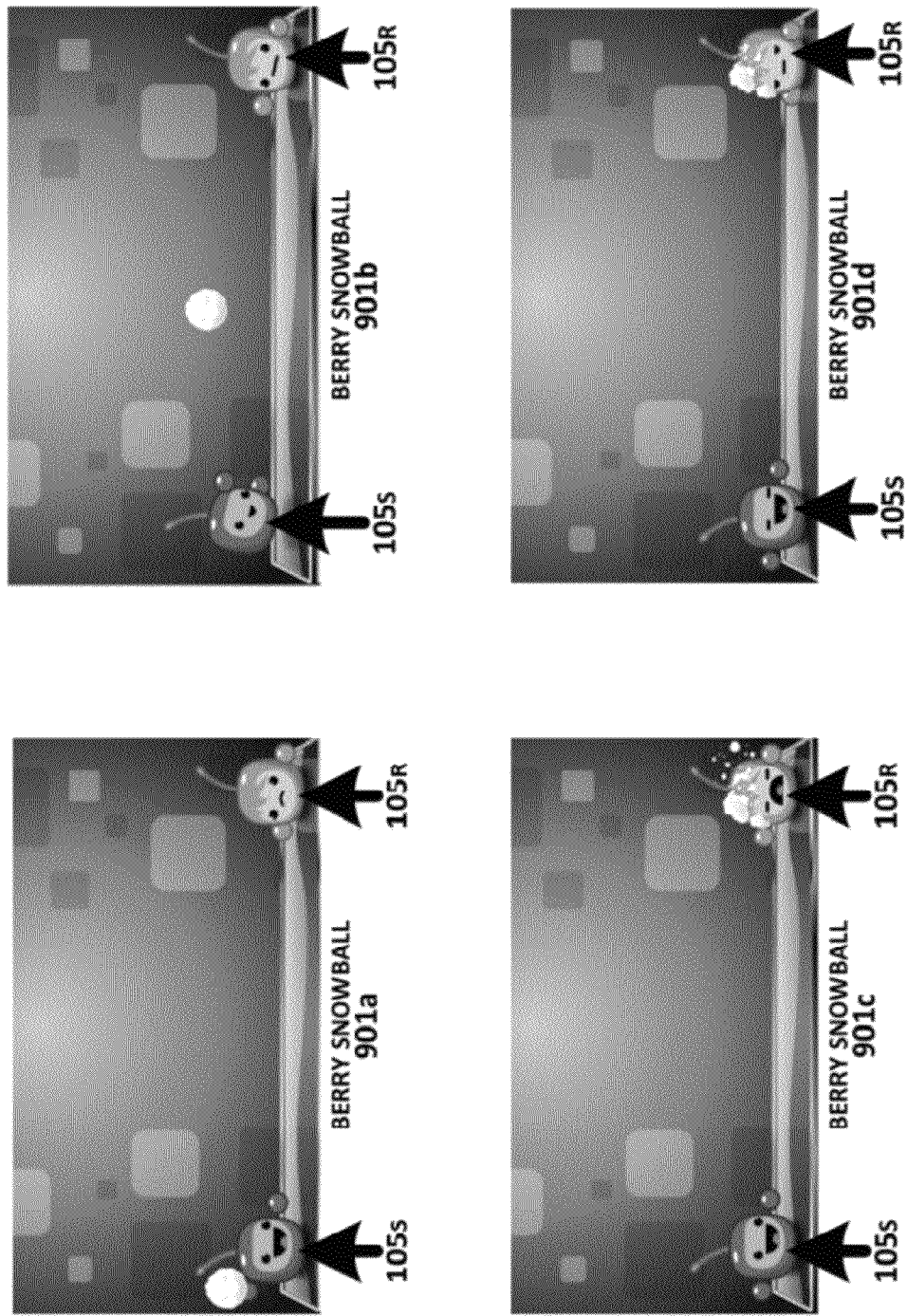
FIG. 9 shows several frames of one animation sequence that can be delivered during the text messaging session according to one embodiment.
Figure 10:
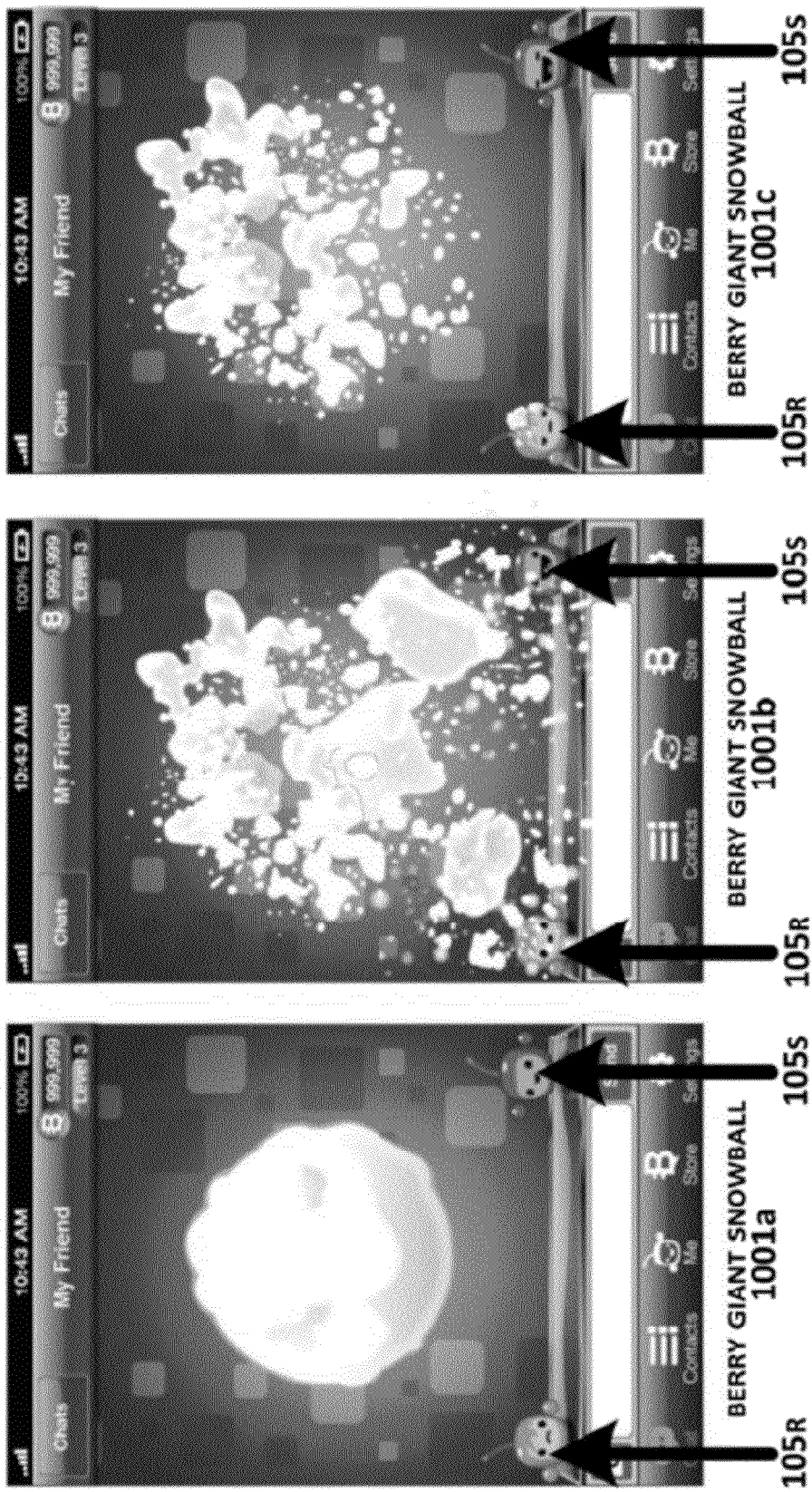
FIG. 10 shows several frames of one animation sequence that can be delivered during the text messaging session according to one embodiment.

The graphical expressions are preferably displayed on both sender computing device 101 and recipient computing device 103, although the form of the display can be different on sender computing device 101 and recipient computing device 105, as shown, for example, in FIGS. 9 and 10. FIG. 9 shows several frames as they appear on sender display 101D of a graphical expression (again an animated graphical expression) which can be used to express playfulness towards another other application user. In this example, sender avatar 105S aims a snowball at recipient avatar 105R (frame 901a), sender avatar 105S throws the snowball at recipient avatar 105R (frame 901b), sender avatar 105S begins to laugh as his snowball hits recipient avatar 105R, who cries after being hit by the snowball (frame 901c), and sender avatar 105S laughs harder at disgruntled recipient avatar 105S (frame 901d).

FIG. 10 shows several frames of the same graphical expression (i.e., the snowball animation) as displayed on recipient display 103D. In this example, sender avatar 105S throws the snowball at recipient avatar 105R (frame 1001a), sender avatar 105S smiles at surprised recipient avatar 105R as the snowball hits recipient display 103D (frame 1001b), and sender avatar 105S laughs at disgruntled recipient avatar 105R (frame 1001c). It is to be noted that in this figure, sender avatar 101S is shown on the right side of sender display 101D which is opposite to the display shown in the other figures. As another example of differential sender and recipient displays of the graphical expression, the application user can blow smoke at another application user. Sender display 101D can show sender avatar 105S donning a gas mask as clouds of smoke appear, whereas recipient display 103D can show recipient avatar 105R being obscured as smoke clouds billow. Or, as another example, sender avatar 105S may cry streams of tears as displayed on sender display 101D whereas recipient avatar 105R may don a snorkel and mask and float as water accumulates to flood the display on recipient display 103D.

FIG. 11 shows several frames of another graphical expression (in this case, an animated graphical expression as displayed on sender computing device 101) which can be used to express displeasure with another application user. In this example, sender avatar 105S activates a magic wand (frame 1101a), waves the magic wand at recipient avatar 105R (frame 1101b), casts a spell on recipient avatar 105R (frame 1101c), and recipient avatar 105R turns into a frog (frame 1101d).

FIG. 12 shows several frames of another graphical expression (again an animated graphical expression as displayed on sender computing device 101) which can be used to express sending a kiss. In this example, sender avatar 105S puckers up (frame 1201a), sends a kiss to recipient avatar 105R (frame 1201b), and recipient avatar 105R receives the kiss (frame 1201c).

Figure 13:
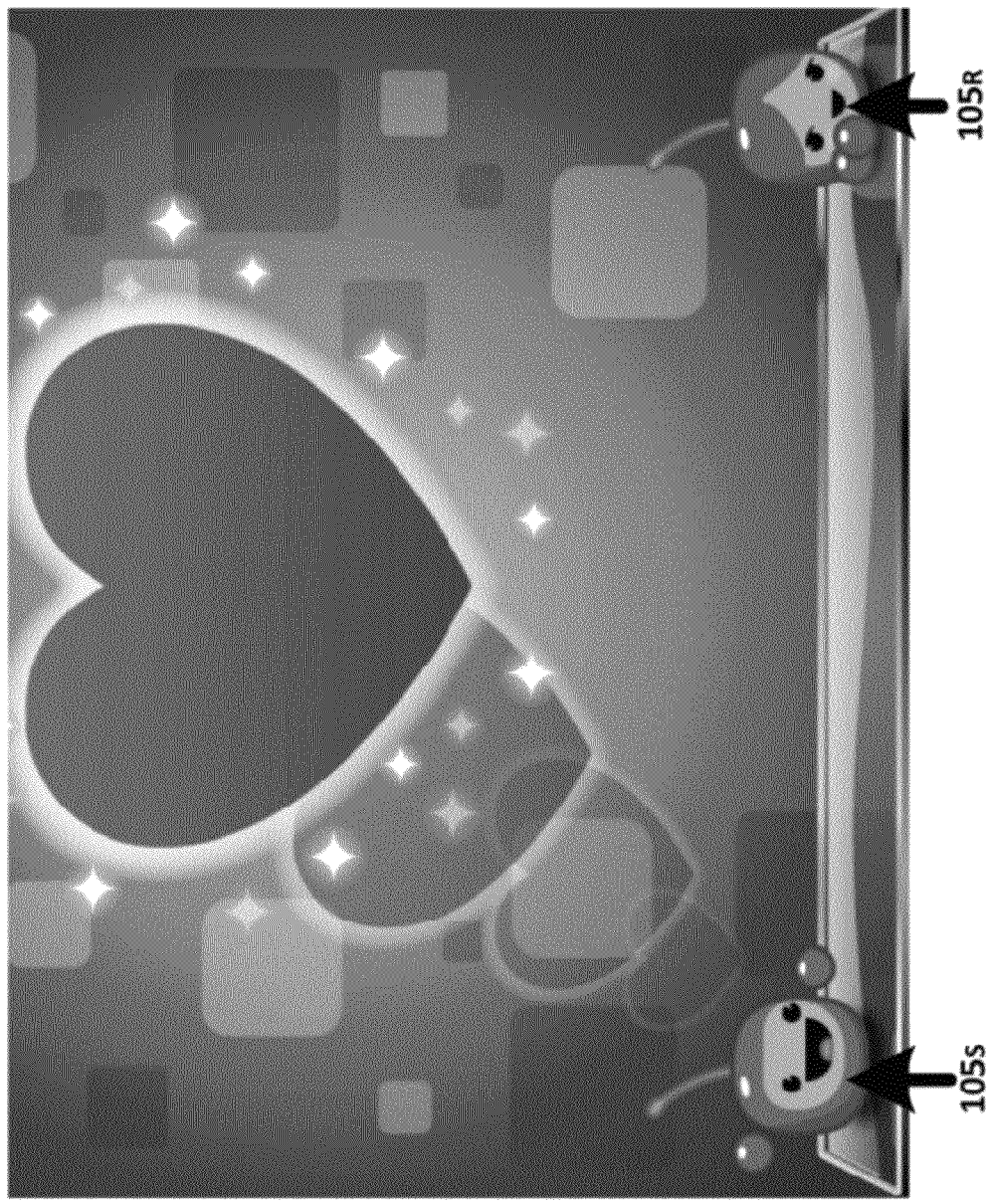
FIG. 13 shows one frame of one animation sequence directed towards an avatar representing a user receiving the graphical expression.

FIG. 13 shows one frame of another animated graphical expression as viewed on sender computing device 101. In this example, sender avatar 105S conveys love to recipient avatar 105R by directing a pulsating heart at recipient avatar 105R.

The system and method described herein can also be used to gamify instant messaging. Gamification is a phenomenon that involves taking an existing experience which can be rather static or uninvolving and adding a gaming layer on top of the experience to make it more fun and interesting. In one embodiment, a currency system can be added to the application such that users accrue points based on the frequency and degree of messaging behaviors. The accrued points can be used to purchase application-related items such as (without limitation) graphical expression skills, accessories for the avatars, and themes for the application background. To maintain user loyalty and further commit users to using the system, users can also earn awards (e.g., badges) depending on completed activities or achieved goals during messaging sessions. For example, user could earn a "star" badge by texting 350 messages in a single day.

It is to be understood that the examples given are for illustrative purposes only and can be extended to other implementations and embodiments with different sets of sensors, defined types of motions, conventions, and techniques. While a number of embodiments are described herein, there is no intent to limit the disclosure to the embodiment(s) disclosed herein. On the contrary, the intent is to cover all alternatives, modifications, and equivalents apparent to those familiar with the art.

Further, while a number of the examples are described as an application running on a computing device, it is to be understood that the application itself, along with the ancillary functions such as sensor operations, device communications, user input, and device display generation, etc., can all be implemented in software stored in a computer readable storage medium for access as needed to run such software on the appropriate processing hardware of the computing device.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method of sending a graphical expression during a text messaging session comprising:
    receiving user input on a first computing device during the text messaging session, the user input specifying one of a plurality of graphical expression modes, wherein each of the plurality of graphical expression modes has a predefined graphical expression, an associated sensor, and a sensor data definition for the predefined graphical expression;
    determining, by confirming that data from one or more sensor of the first computing device received during the text messaging session is from the associated sensor and matches the sensor data definition of the specified one of the plurality of graphical expression modes, that the predefined graphical expression of the specified one of the plurality of graphical expression modes is to be performed; and
    transmitting an expression command from the first computing device to a second computing device through a network during the text messaging session in a communication between the first computing device and the second computing device governed by a text messaging protocol, the expression command identifying the predefined graphical expression to be performed on the second computing device.

2. The method of claim 1 where text messaging protocol is a short message service protocol.

3. The method of claim 1 wherein the first computing device has displayed thereupon a first avatar representing a user of the first computing device and a second avatar representing a user of the second computing device.

4. The method of claim 3 further comprising a step of displaying on the first computing device the first avatar performing the predefined graphical expression on or directed at the second avatar, and wherein the predefined graphical expression is an expressive animation.

5. The method of claim 1 wherein transmitting the expression command identifying the predefined graphical expression to be)performed on the second computing device, is accomplished by transmitting an Extensible Markup Language file in a graphical expression layer which is a separate layer from a text messaging communication layer of the text messaging session.

6. The method of claim 1 wherein the predefined graphical expression includes sound.

7. The method of claim 1 wherein the predefined graphical expression represents an emotion.

8. The method of claim wherein the user input is recognized speech received from a speech recognition module.

9. The method of claim 1 wherein the user input is interpreted recognized speech from a speech recognition module and a natural language processing module.

10. The method of claim 1 further comprising:
    receiving the expression command at the second computing device through the network from the first computing device during the text messaging session in the communication established between the first computing device and the second computing device governed by the text messaging protocol, the expression command identifying the predefined graphical expression to be performed on the second computing device;

retrieving from memory of the second computing device the predefined graphical expression identified by the expression command; and executing the retrieved predefined graphical expression on the second computing device.

11. The method of claim 10 further comprising a step of receiving data input from a user of the second computing device to allow the step of executing the retrieved graphical expression on the second computing device.

12. The method of claim 10 wherein the second computing device has displayed thereupon a first avatar representing a user of the first computing device and a second avatar representing a user of the second computing device.

13. The method of claim 12 further comprising a step of displaying on the second computing device the first avatar performing the predefined graphical expression on or directed at the second avatar, and wherein the predefined graphical expression is an expressive animation.

14. The method of claim 10 wherein the predefined graphical expression includes sound.

15. The method of claim 10 wherein the predefined graphical expression is an action representing an emotion.

16. A s stern comprising:

a first computing device to send a graphical expression during a text messaging session comprising:

a first computing device microprocessor;

one or more first computing device sensor; and a first computing device communication module, wherein the first computing device microprocessor is configured to receive user input specifying one of a plurality of graphical expression modes, wherein each of the plurality of graphical expression modes has a predefined graphical expression, an associated sensor, and a sensor data definition for the predefined graphical expression;

determine, by confirming that data input from the one or more first computing device sensor is from the associated sensor and matches the sensor data definition of the specified one of the plurality of graphical expression modes, that the predefined graphical expression of the specified one of the plurality of graphical expression modes is to be performed; and transmit to a second computing device an expression command identifying the predefined graphical expression to be performed on the second computing device by using the first computing device communication module to communicate with the second computing device through a network during a communication governed by a text messaging protocol.

17. The system of claim 16 wherein the first computing device is further configured to display thereupon one avatar representing a user of the first computing device and another avatar representing another user of the second computing device.

18. The system of claim 17 wherein the first computing device is further configured to display on the first computing device the one avatar performing the predefined graphical expression on or directed at the another avatar, and wherein the predefined graphical expression is an expressive animation.

19. The system of claim 16 further comprising:

the second computing device comprising:

a second computing device microprocessor, and a second computing device communication module, wherein the second computing device microprocessor is configured to receive from the first computing device the expression command identifying the predefined graphical expression to be displayed, the expression command received by using the second computing device communication module to communicate with the first computing device through the network during the communication governed by the text messaging protocol;

retrieve the predefined graphical expression identified by the expression command; and execute the predefined graphical expression.

20. The system of claim 19 wherein the second computing device is further configured to display thereupon one avatar representing a user of the first computing device and another avatar representing another user of the second computing device.

21. The system of claim 20 wherein the second computing device is further configured to display on the second computing device the another avatar performing the predefined graphical expression on or directed at the one avatar, and wherein the predefined graphical expression is an expressive animation.

22. A non-transitoty computer readable medium having stored thereupon computing instructions comprising:

a code segment to receive user input on a first computing device, the user input specifying one of a plurality of graphical expression modes, wherein each of the plurality of graphical expression modes has a predefined graphical expression, an associated sensor, and a sensor data definition for the predefined graphical expression;

a code segment to determine, by confirming that data from one or more sensor of the first computing device is from the associated sensor and matches the sensor data definition of the specified one of the plurality of graphical expression modes, that the predefined graphical expression of the specified one of the plurality of graphical expression modes is to be performed;

a code segment to transmit an expression command from the first computing device to a second computing device through a network during a communication established between the first computing device and the second computing device governed by a text messaging protocol, the expression command identifying the predefined graphical expression to be performed on the second computing device;

a code segment to receive the expression command at the second computing device through the network from the first computing device during the communication established between the first computing device and the second computing device governed by the text messaging protocol, the expression command identifying the predefined graphical expression to be performed on the second computing device;

a code segment to retrieve from memory of the second computing device the predefined graphical expression specified by the expression command; and a code segment to execute the retrieved predefined graphical expression on the second computing device.

* * * * *